United States Patent Office 3,326,995
Patented June 20, 1967

3,326,995
METHOD OF GENERATING FREE PHENYL RADICALS
Chi-Hua Wang, Lexington, Mass., assignor to Arthur D. Little, Inc., Cambridge, Mass., a corporation of Massachusetts
No Drawing. Filed July 13, 1964, Ser. No. 382,372
2 Claims. (Cl. 260—668)

This invention relates to a method of generating free radicals and more particularly to generating aryl and 5-membered heterocyclic radicals.

The possibility of having a ready and economical supply of radicals such as phenyl, furyl, thienyl and phenylene biradicals opens up many interesting avenues to polymer synthesis as well as to the synthesis of new chemicals having unique and interesting properties. For example, polyphenylene has been recognized to have valuable properties such as good resistance to high temperatures and interesting semiconducting characteristics. The ability to generate benzyne or phenylene radicals offers the possibility of developing new synthetic routes to old and new compositions. The availability of pure ortho- and para-polyphenyls may well lead to the use of these materials as unique-type semiconductors and solvents at elevated temperatures. Finally synthetic resins prepared from polyfurans, polythiophenes and polyketones, although not now made, may find important applications once they are available.

The method of this invention is based on the solvolysis of organomercuric salts of either organic or inorganic acids and the subsequent reduction and fragmentation to furnish the free radicals. The steps are carried out at low temperatures and in the absence of any destructive radiation.

In the prior art it has been proposed (J. Am. Chem. Soc., 83, 4477, 4478 (1961); 85, 363 (1936)) to generate carbonium ions by the solvolysis of alkylmercuric salts; but as far as is known there is no prior art directed to the production of aryl radicals such as phenyl and the like. There is also in the prior art the teaching of redox systems to generate reactive free radicals in the absence of radiation. Finally, it is also known to produce free radicals through thermal decomposition or through the use of destructive radiation. However, no simple economic route is available for the production of free radicals such as phenyl, furyl, and thienyl to make these available for polymerization or as intermediates for various synthesis routes.

It is therefore an object of this invention to provide a method of generating free radicals which are aryl or 5-membered heterocyclic radicals. It is another object of this invention to provide a method of the character described which is economical and makes such radicals available for many uses. It is another object to provide an economical and simple route to the production of polyphenyls, polyfurans, polythiophenes, and polyketones. Other objects of the invention will in part be obvious and will in part be apparent hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

The method of this invention comprises the solvolysis of an organic mercuric salt and then the reduction of the organic mercuric cation and subsequent formation of the organic radical. This method of free radical generation is specific to the use of certain types of mercuric compounds and the generation of certain types of free radicals.

The organic mercuric salt which serves as the radical source may be defined as a compound of the type R"RHgR' wherein R represents the free radical to be produced. R"R in combination is a radical which may be aryl, substituted aryl, furyl, substituted furyl, thienyl, or substituted thienyl. R" is either hydrogen or HgR'. R' is an anion of an inorganic or organic acid, the anion being one which has a high dissociation (ionization) constant with Hg.

Generic reactions may be written to illustrate the method of this invention. Thus if R" is H the reaction for free radical generation by the method of this invention may be written as

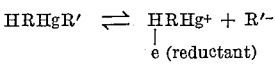
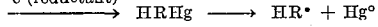

The mercurous intermediate HRHg is a labile compound and readily forms the radical HR° and metallic mercury.

If R" is HgR' this reaction then becomes

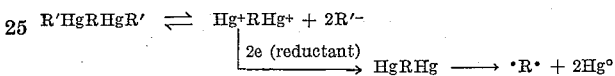
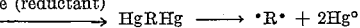

R is chosen from the phenyl, furan and thiophene rings and when they are substituted the substituents may be alkyl groups such as methyl, ethyl, and the like, aryl groups such as phenyl, alkoxy groups such as methoxy, ethoxy and the like, amine groups such as $NH_2$ and substituted amine groups such as $(CH_3)_2N$, the organic acid groups such as HOOC, and the nitrite group.

R' is used to designate the anion of an acid which has a high dissociation constant with mercury. Such anions typically include, but are not limited to, $CH_3COO^-$, $ClO_4^-$

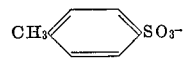

and $CX_3COO^-$ where X is a halogen.

As noted above in the generic formula

R"RHgR' the R" may be either hydrogen or may be a second mercuric salt group represented by HgR'. Where R" is HgR' the R' will be one of those anions listed and will generally be identical to the R' of the other HgR' grouping, although this is not necessary. Where R" is a second HgR' group then the two HgR' groups may be in the ortho, meta or para positions on the phenyl R, or in the 1,2, 1,3, or 1,4 positions on the furan or thiophene R.

The reaction is of course carried out in a suitable solvent for the radical source compound in the presence of a suitable electron donor. This liquid reaction medium should be a solvent for the radical source and will normally be chosen with regard to the chemical characteristics of the radical source. For example, if the anion, R', is derived from an inorganic acid, then it is desirable that a polar solvent be used such as acetic acid, or water-acetic acid solvent mixture. If the anion R' is derived from an organic acid, then a nonpolar or a less polar solvent such as toluene may be used. If the free radicals are to be used to furnish reactive sites for polymerization then the monomer which is to be polymerized, if it is a liquid, may serve as the solvent.

The electron donor may be any material which is capable of providing electrons to the system. Preferably such a donor will be a metal ion which is capable of changing its valence state by a single electron transfer process. The ferrous ion which is capable of being oxidized to ferric iron, is particularly well-adapted to the process of this invention.

Other metals which are capable of serving as electron donors include, but are not limited to, copper, manganese, vanadium, cobalt, chromium, cerium, and titanium. The metal ion may be introduced into the system in any suitable form such as an inorganic salt, e.g., nitrate, sulfate, and the like, or as an organometal compound such as the dicyclopentadienyl derivatives of the transition metals and the β-diketone chelates of the transistion metals. Electron donors which do not contain a metal ion, such as N,N,N',N'-tetramethyl-p-phenylene diamine, and other π-complex forming electron acceptors may also be used.

It is preferable that the electron donor be furnished in a quantity equivalent to this which is required on a stoichiometric basis. The reactions may be carried out at room temperatures or below and it is preferable to provide an inert atmosphere above the liquid reaction medium although this is not necessary.

The following examples, which are meant to be illustrative and not limiting, are given to further illustrate the method of this invention and the use of the free radicals thus produced.

*Example 1*

In this example, in order to indicate the production of phenyl radicals in toluene, benzene was identified and measured quantitatively. The presence of either perchloric or p-toluene sulfonic acid facilitates the ionization of the salt and thus accelerates the overall reaction rate.

Into 400 ml. of toluene were introduced 33.6 grams of phenylmercuric acetate, 18.8 grams of ferrocene (dicyclopentadienyl iron), and a trace of perchloric acid. A blue color appeared instantaneously. This liquid mixture was subjected to vapor phase chromatography and was found to contain about 7 grams of benzene which approached a quantitative yield.

The reactions involved in this example may therefore be represented as

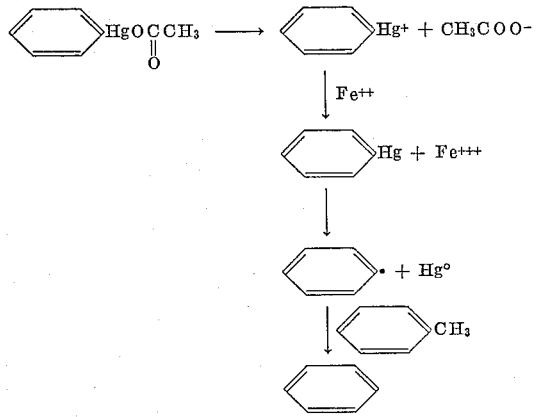

When the perchloric acid was replaced by p-toluene sulfonic acid the benzene yield was about 25% of theoretical.

Although an ionization accelerator such as the perchloric acid or p-toluene sulfonic acid is not necessary, it is preferable to add one in trace amounts.

*Example 2*

In this example the presence of free phenyl radicals was illustrated in their use as active polymerization sites to polymerize a monomer (acrylonitrile) which also served as the solvent for the free radical source compound.

The monomer used was acrylonitrile and into about 10 ml. of this were introduced 50 mg. of phenylmercuric acetate and 5 drops of a 20% solution of $TiCl_3$ in water. Essentially instantaneous polymerization of the acrylonitrile was indicated by the formation of a white precipitate.

In a similar manner when 40 mg. of phenylmercuric acetate and 20 mg. of manganous acetylacetonate (as the electron donor) were added to 10 ml. of methylacrylate and the liquid mixture was permitted to stand overnight a white precipitate of the polymer was formed. When each of these reagents alone was added to similar samples of the monomer no polymer formed under identical conditions.

*Example 3*

Phenylmercuric acetate (400 mg.) was added along with 200 mg. of N,N,N',N'-tetramethyl-p-phenylene diamine as reductant to 20 ml. of methyl alcohol. Instantaneously a blue color characteristic of the cation radical appeared.

These Examples 1–3 illustrate two ways in which phenyl and substituted phenyl radicals may be used, namely as a synthesis route (e.g. for the production of benzene) and as a means for establishing active sites to initiate and continue polymerization of a monomer.

In like manner a compound of the general formula R'HgRHgR', such as 1,2-diacetoxymercuribenzene can be used as a source of the benzyne intermediate as follows:

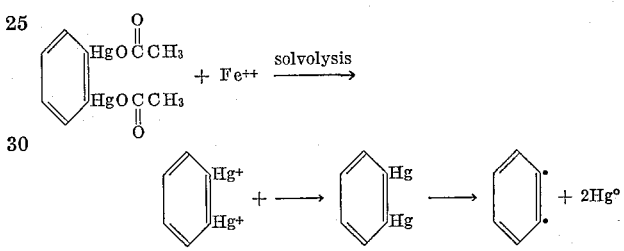

Many different synthesis routes are then open using the benzyne radical. Two such routes are illustrated

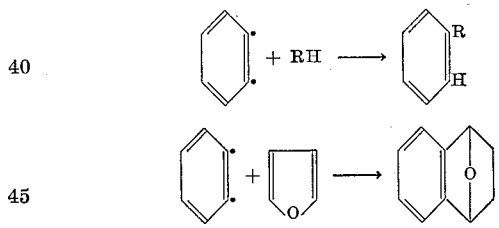

Also, the method of this invention may be used to prepare polyphenylene for which there is at present no successful reliable synthetic route. (See for example J. Org. Chem. 28, 1864 (1963) and J. Am. Chem. Soc. 85, 454 (1963).)

1,4-diacetoxymercuribenzene is formed from the reaction between diphenyl mercury and mercuric acetate, and by the method of this invention can be used to form phenylene biradicals which polymerize to form polyphenylene.

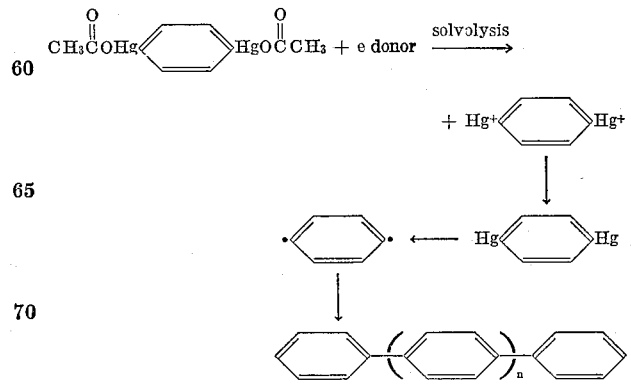

Ortho-polyphenyls may also be prepared as illustrated below:

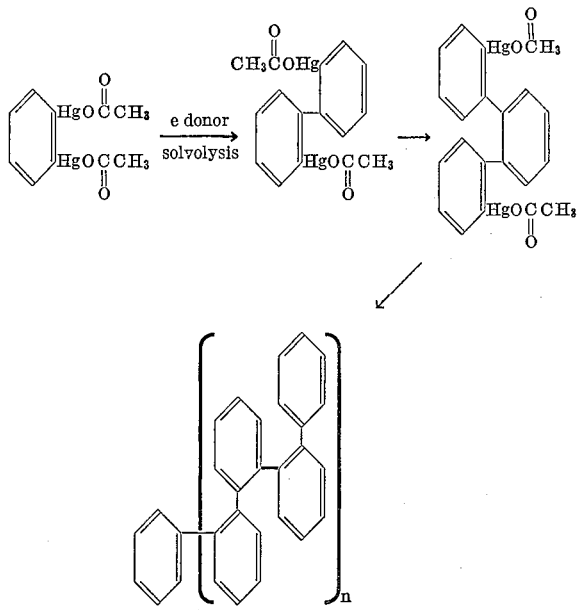

By a route similar to that outlined for the linear polyphenylene, polyfurans can be made from the furyl radicals. Such a polyfuran may be represented as

Acid hydrolysis of such a polyfuran should yield a polyketone of the formula

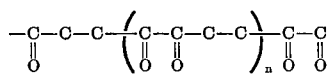

Likewise polythiophenes can be made from thienyl radicals. This polymer may be represented as

Acidic hydrolysis of the polythiophenes can then be used to form mixed polythioketones such as

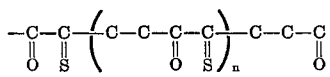

The method of this invention offers a simple and efficient way of providing free radicals which are aryl, substituted aryl, furyl, substituted furyl, thienyl and substituted thienyl. The availability of these radicals in turn offers an entirely new approach to the synthesis of organic compounds and polymers, some of which it has not before been possible to make.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

I claim:
1. In a liquid system which employs free phenyl radicals for reactive sites, the method of furnishing said free phenyl radicals comprising the steps of
   (a) forming said liquid system by adding a radical source selected from the group consisting of phenylmercuric acetate and diacetoxymercuribenzene to a solvent for said radical source;
   (b) adding to said liquid system a small amount of an ionization accelerator selected from the group consisting of perchloric acid and p-toluene sulfonic acid; and
   (c) adding an electron donor capable of supplying electrons to said liquid system, whereby through solvolysis and reduction there is provided phenyl radicals and metallic mercury, said electron donor being selected from the group consisting of (1) a metal ion capable of changing its valence state by a single electron transfer process and being selected from the group consisting of iron, copper, manganese, vanadium, cobalt, chromium, cerium and titanium, and (2) N,N,N',N'-tetramethyl-p-phenylene diamine.

2. A method of making benzene comprising the steps of dissolving in toluene a phenyl radical source selected from the group consisting of phenylmercuric acetate and diacetoxy-mercuribenzene, and adding to the resulting solution an electron donor characterized as being a metal ion capable of changing its valence state by a single electron transfer process and being selected from the group consisting of iron, copper, manganese, vanadium, cobalt, chromium, cerium and titanium, and an ionization accelerator selected from the group consisting of perchloric acid and p-toluene sulfonic acid, whereby phenyl radicals are formed and converted to benzene.

References Cited

UNITED STATES PATENTS

| | | | |
|---|---|---|---|
| 2,451,052 | 10/1948 | Andersen | 260—434 |
| 3,215,681 | 11/1965 | Volans | 260—94.9 |

OTHER REFERENCES

Jensen et al., "Jour. American Chemical Society," vol. 83 (1961), pp. 4477–8.

Jensen et al., "Jour. American Chemical Society," vol. 85 (February 1963), pp. 363–4 and 367.

SAMUEL H. BLECH, *Primary Examiner.*